July 17, 1951
R. G. LE TOURNEAU
2,561,211
AUTOMOTIVE DUMP WAGON
Filed April 22, 1946
4 Sheets-Sheet 1
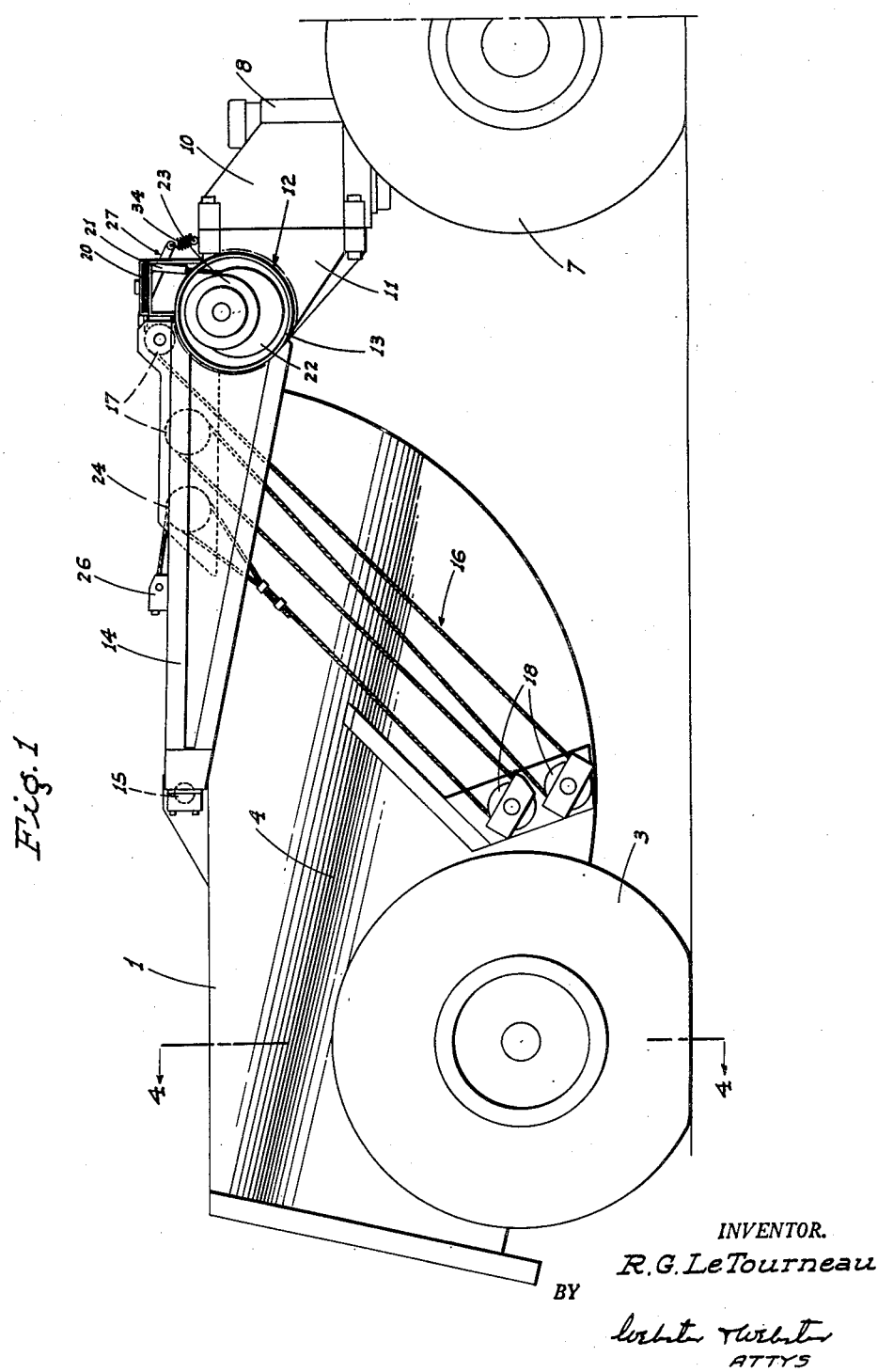
INVENTOR.
R.G. LeTourneau
BY
ATTYS July 17, 1951  R. G. LE TOURNEAU  2,561,211
AUTOMOTIVE DUMP WAGON
Filed April 22, 1946  4 Sheets-Sheet 3
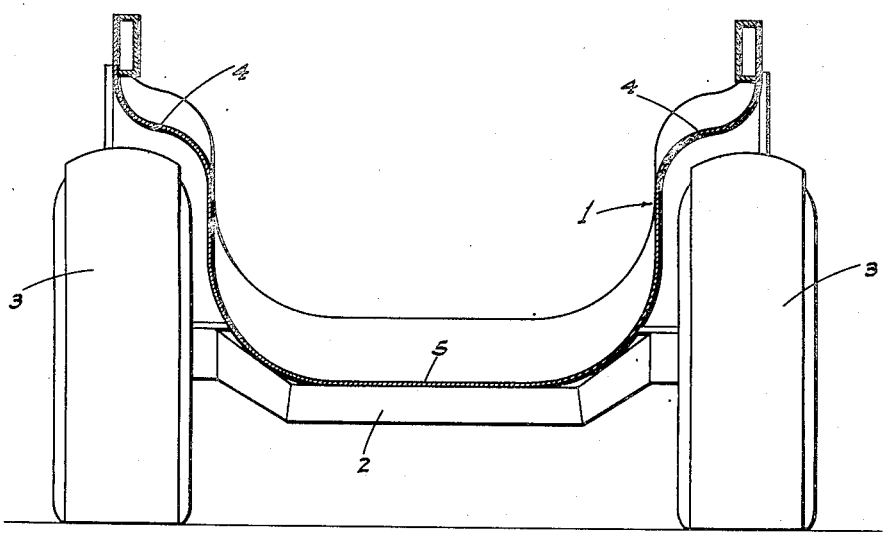
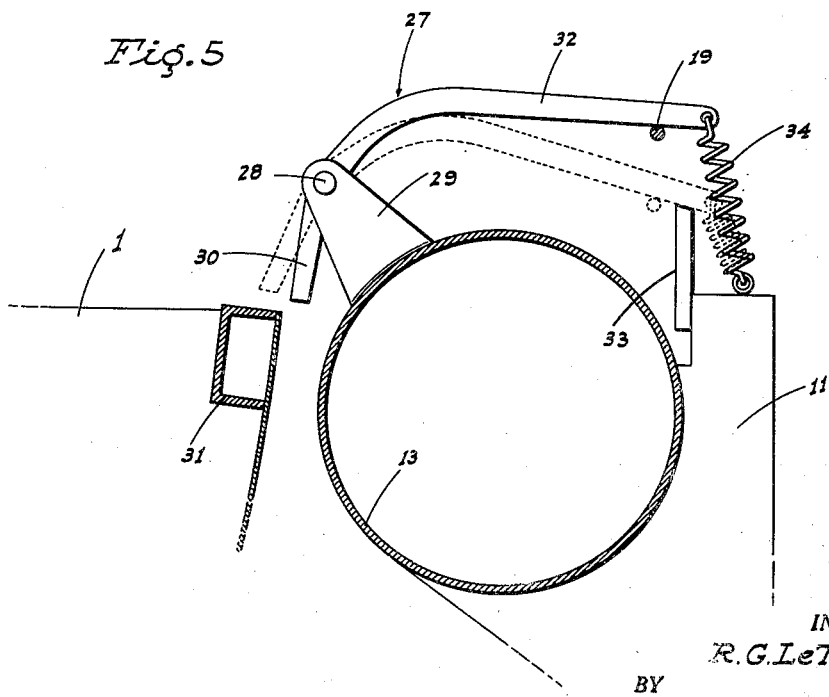
INVENTOR.
R. G. LeTourneau
BY
ATTYS

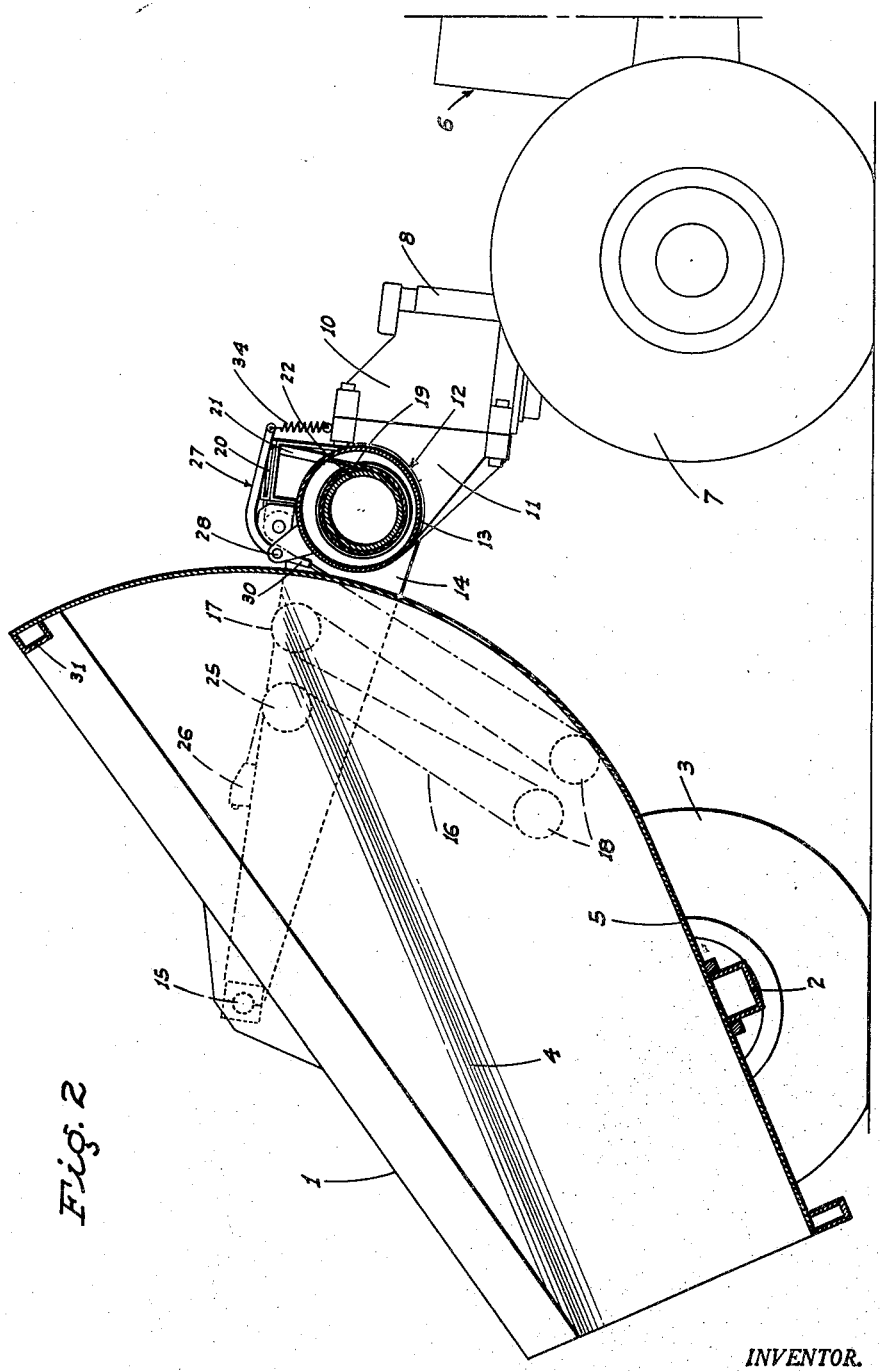

Patented July 17, 1951

2,561,211

UNITED STATES PATENT OFFICE 2,561,211

AUTOMOTIVE DUMP WAGON

Robert G. Le Tourneau, Peoria, Ill., assignor to R. G. Le Tourneau, Inc., Stockton, Calif., a corporation of California Application April 22, 1946, Serial No. 664,080

14 Claims. (Cl. 298—19)

This invention is directed in general to an improved automotive dump wagon for use in connection with the hauling of earth or other material from place to place.

One object of this invention is to provide an automotive dump wagon which comprises, in novel unitary combination, a tractor, a wheel supported dump body, and a connecting assembly extending between the tractor and dump body in normal draft relation to the latter; said connecting assembly including power actuated means operative to cause dumping of the body from a normal transport or load carrying position to a rearwardly tilted discharge position.

Another object of the present invention is to provide an automotive dump wagon, as in the preceding paragraph, in which the connecting assembly includes a draft yoke which is generally U-shaped in plan and straddles the dump body from the front of the latter; the rear ends of the legs of such draft yoke being pivoted to the dump body on opposite sides some distance rearwardly of its forward end and adjacent the top thereof but ahead of the supporting wheels, and a power actuated block and tackle cable system coupled between the yoke and the dump body in lift relation to the forward end of the latter.

A further object of the invention is to provide an automotive dump wagon which is constructed so that it may be easily loaded, and readily and quickly dumped; the dump body, while open at the rear end, being designed to prevent load spillage during transport.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 1 is a side elevation of the automotive dump wagon, with the dump body in transport position.

Figure 2 is a longitudinal sectional elevation, with the dump body tilted to load-discharge position.

Figure 4 is a cross section on line 4—4 of Fig. 1.

Figure 5 is an enlarged fragmentary section on line 5—5 of Fig. 3.

Figure 3:
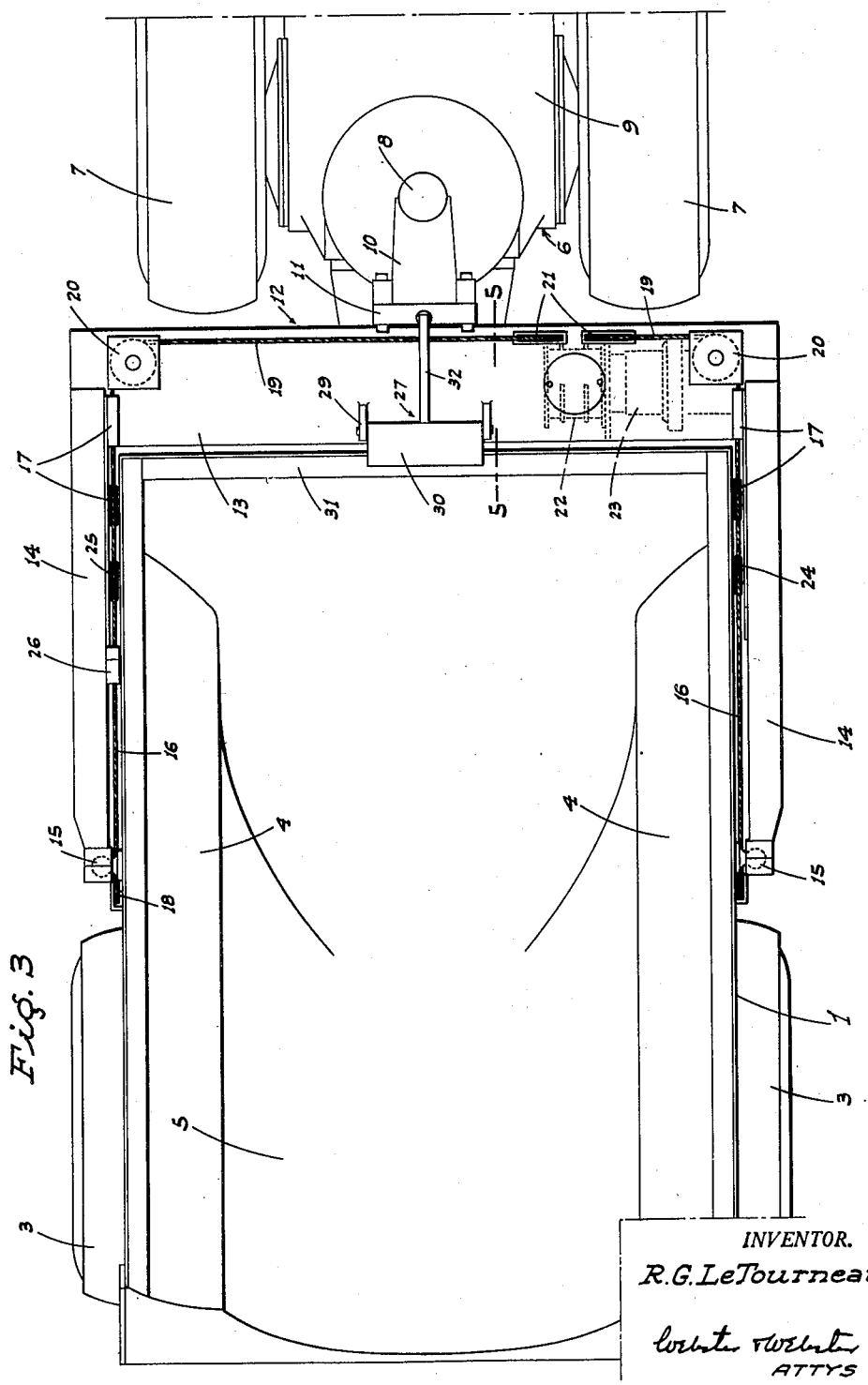
Figure 3 is a plan view of the implement.

Referring now more particularly to the characters of reference on the drawings, the improved automotive dump wagon comprises an open topped dump body 1 which is likewise open at its rear end for discharge of the load as will hereinafter appear. The dump body 1 is supported adjacent its rear end by a drop center axle 2 fitted at opposite ends by pneumatic tire wheels 3. Above the wheels 3 the sides of the dump body 1 flare laterally outwardly, as at 4, so as to increase the capacity of said body, and to strengthen the same.

The dump body 1 is formed so that when in its normal transport position, as in Fig. 1, the bottom 5 of said body slopes forward and downward, whereby to prevent load spillage from the open rear end upon movement of the implement from place to place. The front end of the body curves upward from the bottom, as shown.

A two-wheel tractor, indicated generally at 6, is disposed ahead of the wheel supported dump body, and includes a pair of transversely spaced drive wheels 7 between which an electric power steering unit 8 upstands from a rear deck 9 of said tractor. The electric power steering unit 8 includes an attachment head 10 rigidly secured to a central, forwardly projecting neck 11 of a draft yoke indicated generally at 12. The unit 8 is not necessarily electrically actuated and can be of any other type.

The draft yoke 12 is of rigid, heavy duty construction and includes a hollow cross beam 13 of tubular configuration, and a pair of side beams 14 extending rearwardly from opposite ends thereof. The draft yoke 12 straddles the dump body 1 from the front and adjacent the top thereof; the rear ends of the side beams 14 being pivoted to corresponding sides of the body by ball and socket units 15. The ball and socket units are disposed intermediate the ends of the dump body at points adjacent its upper edges and ahead of the axis of wheels 3; the dump body thus normally tending to tilt downward at its front end.

A pair of block and tackle cable systems 16, including top sheaves 17 and bottom sheaves 18, are connected between the side beams 14 adjacent the forward ends thereof and the sides of the bowl adjacent the bottom of the latter; said block and tackle systems being disposed at a downward and rearward slope so that the bottom sheaves 18 are substantially vertically alined with corresponding ball and socket units 15. The block and tackle cable systems 16 thus suspend the dump body above ground, and each such system includes a pull reach 19 which extends about a direction changing sheave 20 on the adjacent end of the tubular cross beam 13, and thence extends laterally inwardly over sheaves 21 which direct said pull reaches into the cross beam.

Within the cross beam 13 the pull reaches 19 are wound in the same direction about a double drum 22 of a reversible electric winch 23 mounted within said cross beam for protection. This electric power winch is controlled by the tractor operator by means of a circuit (not shown), and such winch includes a normally set brake which releases, automatically, only when the winch is actuated. A generator on the tractor supplies electricity for the operation of the winch.

The dead end of one block and tackle cable system 16 is anchored as at 24, but the corresponding end of the opposite system passes over a sheave 25 and is adjustably anchored as at 26 whereby both systems can be set to equal length.

When the described dump wagon is in use, the dump body 1 is filled, with the material to be transported, by shovel, drag line, chute or the like. Thereafter the implement, under the power of the tractor 6, travels to the point of discharge of the load. After the implement has been maneuvered to proper position to unload, the operator actuates the winch 23 in a direction to pull in on the reaches 19, shortening the block and tackle cable systems 16. This results in raising or upward tilting of the dump body about the ball and socket units as an axis, and until the load spills from the rear open end of said body. As the body is so tilted, the wheels move forward somewhat by reason of the fact that their axis is normally to the rear of the ball and socket units 15; such forward movement of the wheels during unloading being advantageous as it permits of full spillage of the load without undue piling up of the latter.

From its tilted, discharge position the dump body is returned to normal transport position by merely reversing the winch 23.

In order to prevent reactive, upward tilting of the dump body when the implement is maneuvered by backing, the following automatic stop unit is employed:

A longitudinal extending bell crank lever 27 is pivoted intermediate its ends as at 28 between brackets 29 which are fixed on and upstands from the cross beam; one leg 30 of said lever being relatively wide and normally depending — as shown in dotted lines in Fig. 5—into the path of upward movement of the cross brace 31 which the body includes at its upper front edge. In this normal position of the lever 27, its other leg 32 rests on an upstanding stop 33 on the neck 11, under the influence of a tension spring 34 connected between said other leg and neck 11, and at the same time rides across and somewhat lowers the adjacent pull reach 19. The arrangement thus normally prevents any reactive upward tilting of the dump body.

However, when the pull reaches are highly tensioned to shorten the block and tackle cable systems 16 to cause dumping of the body, the leg 32 is moved upward by the adjacent and engaged pull reach 19, swinging lever 27 in a direction to clear leg 30 from the path of cross brace 31, as shown in full lines in Fig. 5.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, adjustable means tiltably suspending the dump body ahead of its wheels from the yoke, and a power unit mounted on the cross beam of the yoke operatively connected to said body suspending means; the cross beam of the yoke being hollow and said power unit being disposed therein.

2. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a block and tackle cable system tiltably suspending the dump body ahead of its wheels from the yoke, and a power winch mounted on the cross beam of the yoke operatively connected to said cable system.

3. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a block and tackle cable system tiltably suspending the dump body ahead of its wheels from the yoke, and a power winch mounted on the cross beam of the yoke operatively connected to said cable system; said system including a block and tackle connected between the yoke and body on opposite sides of the latter, each block and tackle having a pull reach connected to the power winch for simultaneous actuation by the latter in the same direction.

4. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a block and tackle cable system tiltably suspending the dump body ahead of its wheels from the yoke, and a power winch mounted on the cross beam of the yoke operatively connected to said cable system; the cross beam being hollow and the power winch being disposed therein.

5. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a pair of transversely spaced block and tackle cable systems connected between the yoke and relatively low points on the dump body on opposite sides and supporting the front of the body when the latter is in load carrying position, and a power winch mounted on the yoke and operatively coupled to said block and tackle systems.

6. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a pair of transversely spaced block and tackle cable systems connected between the yoke and relatively low points on the dump body on opposite sides and supporting the front of the body when the latter is in load carrying position, and a power winch mounted on the yoke and operatively coupled to said block and tackle systems; the rear ends of the legs of the yoke being pivoted to the dump body adjacent the top thereof.

7. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a pair of transversely spaced block and tackle cable systems connected between the yoke and relatively low points on the dump body on opposite sides and supporting the front of the body when the latter is in load carrying position, and a power winch mounted on the yoke and operatively coupled to said block and tackle systems; the rear ends of the legs of the yoke being pivoted to the dump body adjacent the top thereof, and ahead of the axis of the supporting wheels.

8. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a pair of transversely spaced block and tackle cable systems connected between the yoke and relatively low points on the dump body on opposite sides and supporting the front of the body when the latter is in load carrying position, and a power winch mounted on the yoke and operatively coupled to said block and tackle systems; the rear ends of the legs of the yoke being pivoted to the dump body adjacent the top thereof, and ahead of the axis of the supporting wheels, said low points on the dump body being substantially vertically alined with the pivots for said yoke legs.

9. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, a pair of transversely spaced block and tackle cable systems connected between the yoke and relatively low points on the dump body on opposite sides and supporting the front of the body when the latter is in load carrying position, and a power winch mounted on the yoke and operatively coupled to said block and tackle systems; said block and tackle cable systems extending at a downward and rearward slope from the yoke to the body.

10. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body, adjacent the top edge thereof and intermediate the ends of the body, and power actuated lifting means suspending the dump body ahead of its wheels from the yoke; there being a movable stop unit normally preventing upward tilting of the dump body at the front, and means to move said stop unit.

11. A dump wagon comprising a dump body open top and rear, transversely spaced wheels supporting the body adjacent its rear end, a vehicle supported draft yoke straddling the dump body from the front, said yoke including a cross beam and rearwardly projecting spaced apart side beams, means pivoting the side beams at their rear ends to the sides of the dump body adjacent the top edge thereof and intermediate the ends of the body, and power actuated lifting means suspending the dump body ahead of its wheels from the yoke; there being a movable stop unit normally preventing upward tilting of the dump body at the front, and said suspending means moving said stop unit, when actuated to lift the dump body.

12. A dump wagon comprising a dump body open at its top and rear, transversely spaced wheels supporting the body adjacent its rear end, a vehicle supported draft yoke, such draft yoke including a front cross beam and rearwardly projecting side beams, said side beams projecting beyond the rear end of the yoke supporting vehicle, said rearwardly projecting beams straddling the body, the rear ends of the beams being pivoted to the sides of the body adjacent the top edges of said sides and at a point substantially midway between the ends of the body, pulleys on each arm, pulleys on each side of the body adjacent the bottom thereof and in substantially vertical alinement with the pivot points between the side beams and the body, a cable dead-ended on each arm and reeved through the pulleys on the adjacent side of the body and on said arm, said cables being effective to hold the forward end of the body in suspension between the arms and ground, and power means operative to pull on and slacken the cables to effect raising or lowering of the body about the axis of its supporting wheels.

13. A dump wagon comprising a pair of rear supporting wheels, a mobile support disposed in spaced relation forwardly of the rear wheels, a dump body supported between the rear wheels for vertical tilting movement, the center of gravity of the body being forwardly of said wheels whereby said body normally tends to fall downwardly at a point between the rear wheels and the mobile support, a draft yoke on the mobile support, such yoke including rearwardly projecting side beams straddling the dump body from the front and pivoted at their rear ends to the sides of the dump body adjacent the top edges thereof and intermediate the ends of such dump body, cable suspension means mounted on the draft yoke and supporting and normally suspending the forward end of the dump body against tilting downward at such forward end, and power means effective to operate the cable suspension means to lift the forward end of the dump body vertically.

14. A dump wagon comprising a pair of rear supporting wheels, a mobile support disposed in spaced relation forwardly of the rear wheels, a dump body supported between the rear wheels for vertical tilting movement, the center of gravity of the body being forwardly of said wheels whereby said body normally tends to fall downwardly at a point between the rear wheels and the mobile support, a draft yoke on the mobile support, such yoke including rearwardly projecting side beams straddling the dump body from the front and pivoted at their rear ends to the sides of the dump body adjacent the top edges thereof and intermediate the ends of such dump body, a lifting element normally depending from the yoke and connected at its lower end to the forward end of the dump body and holding the latter suspended against tilting downwardly at said forward end, and power means connected with the lifting element and effective to operate the latter to lift the forward end of the dump body vertically.

ROBERT G. LE TOURNEAU.

REFERENCES CITED

The following references are of record in the file of this patent:

UNITED STATES PATENTS

| Number | Name | Date |
|---|---|---|
| 97,846 | Willson | Dec. 14, 1869 |
| 312,078 | Bowes | Feb. 10, 1885 |
| 396,982 | Cable | Jan. 29, 1889 |
| 468,359 | McCraney | Feb. 9, 1892 |
| 1,357,279 | Denny | Nov. 2, 1920 |
| 1,652,262 | Walter | Dec. 13, 1927 |
| 1,704,430 | Greer et al. | Mar. 5, 1929 |
| 1,707,345 | Brown | Apr. 2, 1929 |
| 1,728,460 | Weber et al. | Sept. 17, 1929 |
| 2,027,098 | Helms | Jan. 7, 1936 |
| 2,465,244 | Lutz | Mar. 22, 1949 |